United States Patent [19]

Churchwell

[11] Patent Number: 4,945,859
[45] Date of Patent: Aug. 7, 1990

[54] COMPLETE DEER FEEDER

[76] Inventor: William C. Churchwell, 3309 Red Cliff Cir., Temple, Tex. 76502

[21] Appl. No.: 363,100

[22] Filed: Jun. 8, 1989

[51] Int. Cl.⁵ .............................................. A01K 5/02
[52] U.S. Cl. ................................. 119/57.91; 119/54
[58] Field of Search .............. 119/51.11, 57.91, 54, 119/57.92, 51.13

[56] References Cited

U.S. PATENT DOCUMENTS

| | | | |
|---|---|---|---|
| 564,849 | 7/1896 | Stewart, Jr. | 119/57.91 |
| 2,598,977 | 6/1952 | Dale et al. | 119/51.11 |
| 3,034,480 | 5/1962 | French | 119/57.91 |
| 3,195,508 | 7/1965 | Lehman et al. | 119/51.11 |
| 3,780,701 | 12/1973 | Wentworth, Sr. | 119/54 |
| 3,920,224 | 11/1975 | Fassauer | 119/51.11 |
| 4,270,489 | 6/1981 | Joronen | 119/54 |
| 4,292,930 | 10/1981 | Olsen | 119/57.91 |

Primary Examiner—Paul J. Hirsch
Attorney, Agent, or Firm—Richards, Medlock & Andrews

[57] ABSTRACT

A feeder (10) is disclosed which includes a bucket (16) and a conical section (28) extending from the lower end of the bucket to a discharge opening (30). A distributing assembly (36) predictably meters feed (70) from the interior of the bucket and conical section either by the action of wind against a sphere (14) or by an electrical feeding assembly (102). The distributing assembly (36) includes a plate (38), a rod (40) pivoted from the plate and a disc (42) mounted on a rod. Posts (66, 68) on the disc (42) interact with orifices (44, 46) on the plate to meter the feed.

8 Claims, 3 Drawing Sheets

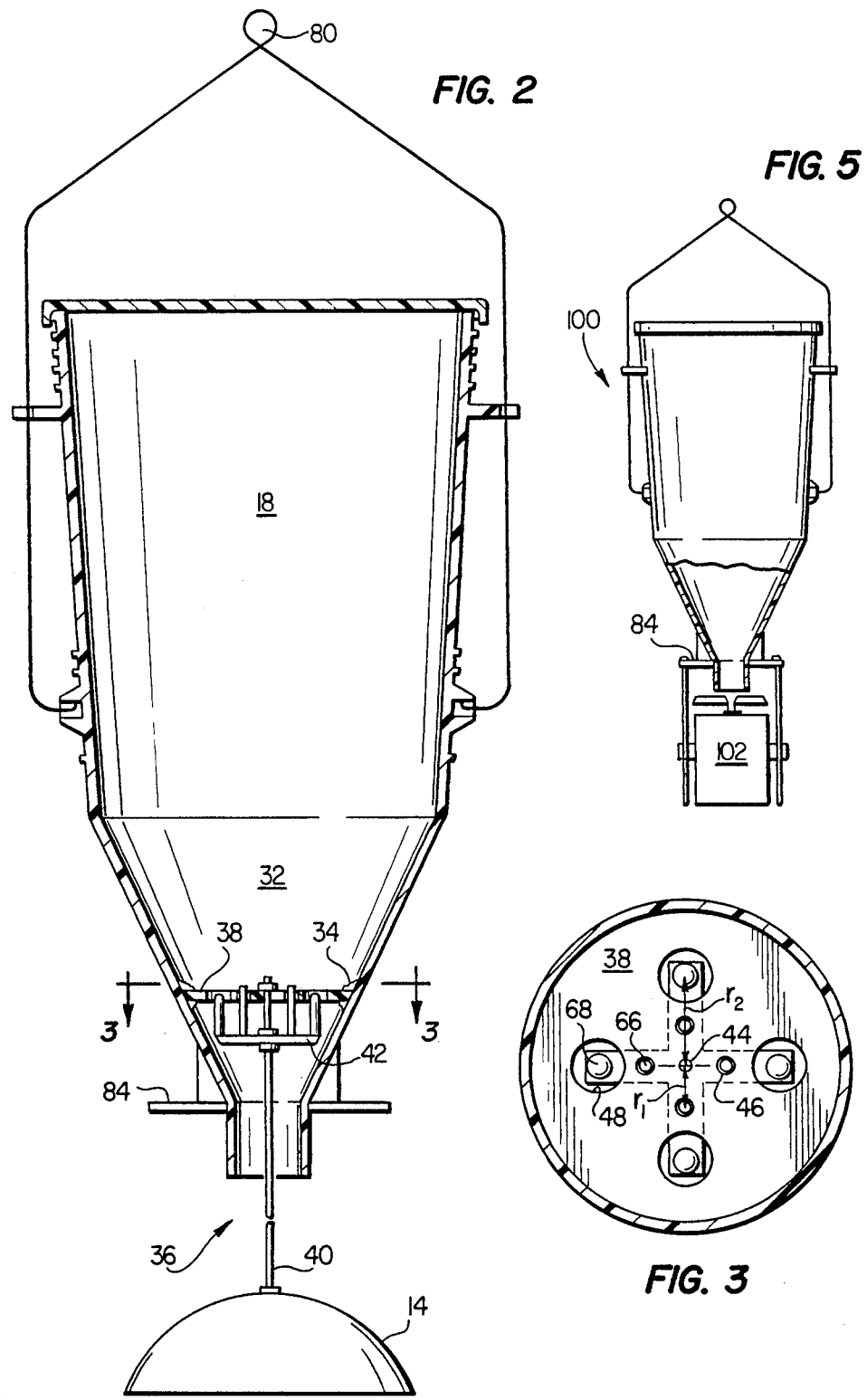

COMPLETE DEER FEEDER

TECHNICAL FIELD

This invention relates to a feeder for wildlife, and in particular to a remote operating deer feeder.

BACKGROUND OF THE INVENTION

In the country, many people like to set out a deer feeder to attract deer on to their property or provide feed to the deer during the winter or other hard times. Over the years, automated feeders have been developed which are intended to automatically feed a small quantity of feed to the ground over time. Such feeders are often wind powered or powered by small electric devices using common batteries.

While such feeders are somewhat effective, they do suffer a number of disadvantages. For example, they are often difficult and inconvenient to load. Also, many feeders can be operated in a position where the feed simply empties out of the feeder on to the ground all at one time, defeating the purpose of the feeder in providing a constant, uniform discharge. All known existing feeders have a flat bottom, leaving up to 20% of the corn still in the feeder. The handle at the top of the known existing feeders will not allow a bucket to hang straight and the pressure from the weight of the corn will make the top of the bucket oblong, making it difficult to take off and put on the top. Therefore, a need exists for an improved feeder which will provide more convenience and better distribution of the feed.

SUMMARY OF THE INVENTION

In accordance with one aspect of the present invention, a deer feeder is provided which comprises a bucket having an interior. A conical section having an interior extends from the lower end of the bucket. The conical section has a discharge opening at its lower end. A distributing assembly is provided which includes a plate mounted in the interior of the conical section which has at least one feed orifice of predetermined size therethrough for passing feed from the bucket interior to the exterior of the feeder. A rod is pivoted at its upper end to the plate and extends downward out of the conical section through the discharge opening. A metering disc is mounted on the rod which has a metering post of predetermined size, usually slightly less than the size of the feed orifice. The metering disc is mounted on the rod so that when the rod is vertical, the metering post prevents feed from passing from the bucket interior through the feed opening. However, if the rod is pivoted from vertical, the metering post will permit a predetermined quantity of feed to pass through the feed orifice.

In accordance with another aspect of the present invention, a handle is pivotally attached to the bucket near the lower end of the bucket. At least one clip extends from the bucket near the upper end thereof for attachment of the handle to support the feeder in the desired orientation. However, the handle can be released from the clip to pivot the upper end of the bucket down to facilitate replenishment of the feed in the bucket.

In accordance with yet another aspect of the present invention, the plate has a center, and four feed orifices are formed through the plate at equal radii from the center at 90° intervals relative to adjacent feed orifices. The rod is pivoted to the plate at its center. The metering disc also has a center with four metering posts at equal radii from the disc center and at 90° intervals to each other. In accordance with yet another aspect of the present invention, guide orifices can be provided through the plate and guide rods on the metering disc to maintain a preferred orientation between the metering disc and the plate. The device can be powered by wind, or an electric motor can be attached to substitute for the wind device to meter the feed.

BRIEF DESCRIPTION OF THE DRAWINGS

The novel features believed characteristic of the invention are set forth in the appended claims. The invention itself, along with the further objectives and advantages thereof, is best understood by reference to the following Detailed Description of an illustrative embodiment taken in conjunction with the accompanying drawings in which:

FIG. 2 is a vertical cross section of the feeder;

FIG. 3 is a horizontal cross section taken along line 3—3 in FIG. 2;

FIG. 5 is a side view of a first modification of the feeder operated by an electric motor.

DETAILED DESCRIPTION

Figure 1:
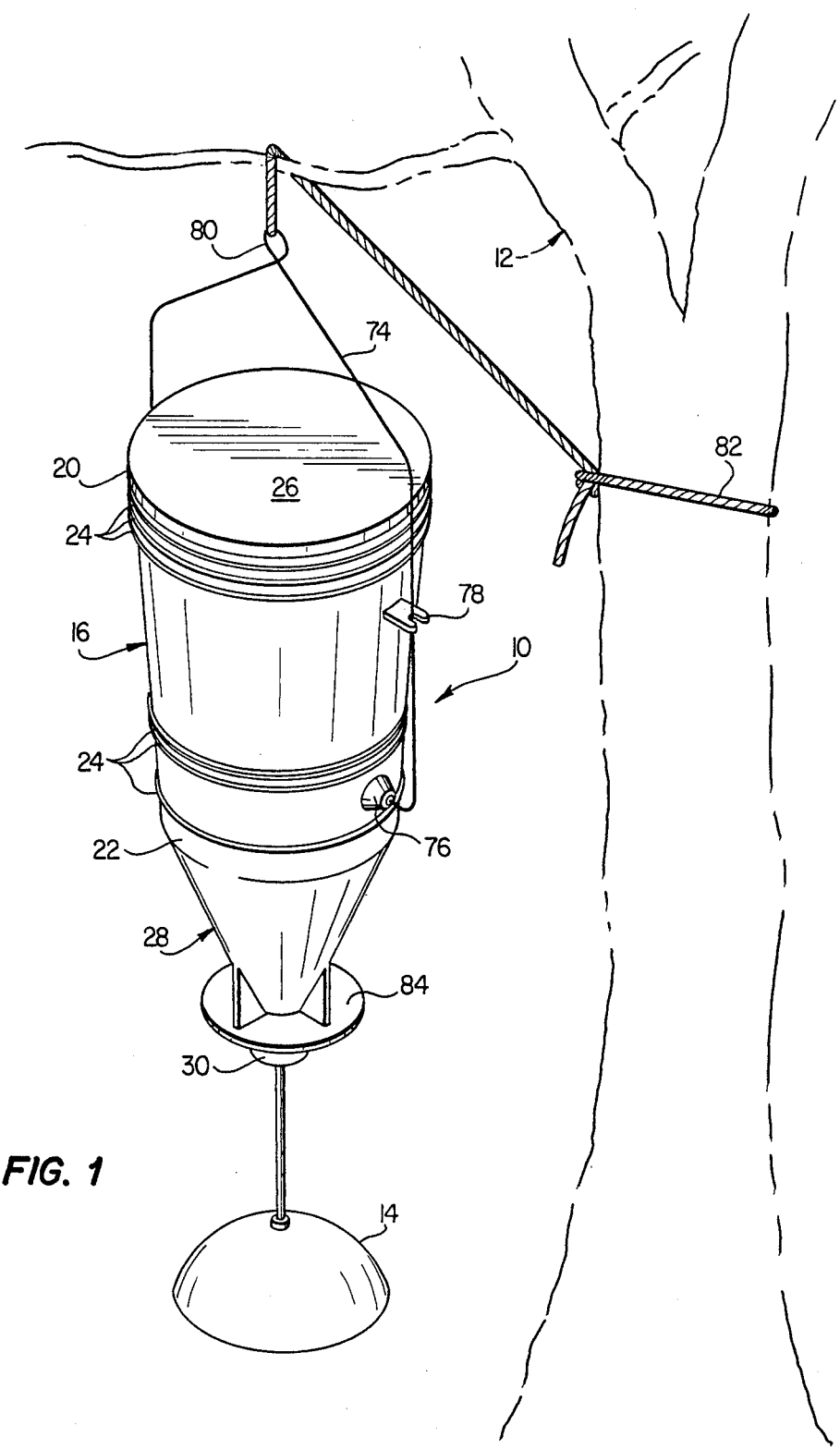
FIG. 1 is a perspective of a feeder forming a first embodiment of the present invention hanging from a tree.

With reference now to FIGS. 1–4, a feeder 10 forming a first embodiment of the present invention will be described. As can be seen in FIG. 1, the feeder 10 can be suspended from a tree 12 or any other suitable structure which is high enough suspend the feeder above the ground. Feeder 10 is designed to operate through the action of wind striking the sphere 14 in a manner described hereinafter. However, any other suitable mechanism, such as an electric motor, can be used as a substitute for the wind power as desired.

With reference specifically to FIGS. 1 and 2, the feeder can be seen to include a generally cylindrical bucket 16 having an interior 18, an upper end 20 and a lower end 22. The bucket 16 is preferably formed of plastic with reinforcement ribs 24 extending outward from the bucket for enhanced strength. A cover 26 can be snapfit over the upper end 20 of the bucket to protect the feed therein from rain and the like.

A conical section 28 extends downward from the lower end 22 of the bucket 16. Preferably, the bucket 16 and conical section 28 are molded in one piece of plastic, but other suitable construction techniques can be utilized as desired. The conical section converges downwardly to a discharge opening 30, feeding 100% of corn in the bucket 16, as compared to prior known flat bottom buckets which only feed about 80% (leaving 20% of the corn on the flat bottom of the bucket because it cannot flow to the opening in the bottom). In the interior 32 of the conical section at one horizontal plane are formed inwardly extending lips 34 whose purpose will be described later.

A distributing assembly 36 forms part of the feeder 10 and includes a plate 38, a pivotal rod 40, a metering disc 42 and the wind sphere 14. The plate 38 is circular and is snapfit in the interior of the conical section 28 by lips 34. As best seen in FIG. 3, a pivot orifice 44 is formed at the center of the plate 38. Four guide orifices 46 are formed at radius r1 from the center of the plate and distributed at uniform 90° spacings from the adjacent guide orifices. Four feed orifices 48 are also formed through the plate 38 at equal radii r2 from the center of the plate, and are also distributed at uniform 90° degrees spacings from the adjacent feed orifices. As will be observed, each feed orifice lies on a radius coinciding in part with the radius of a pivot orifice.

Figure 4:
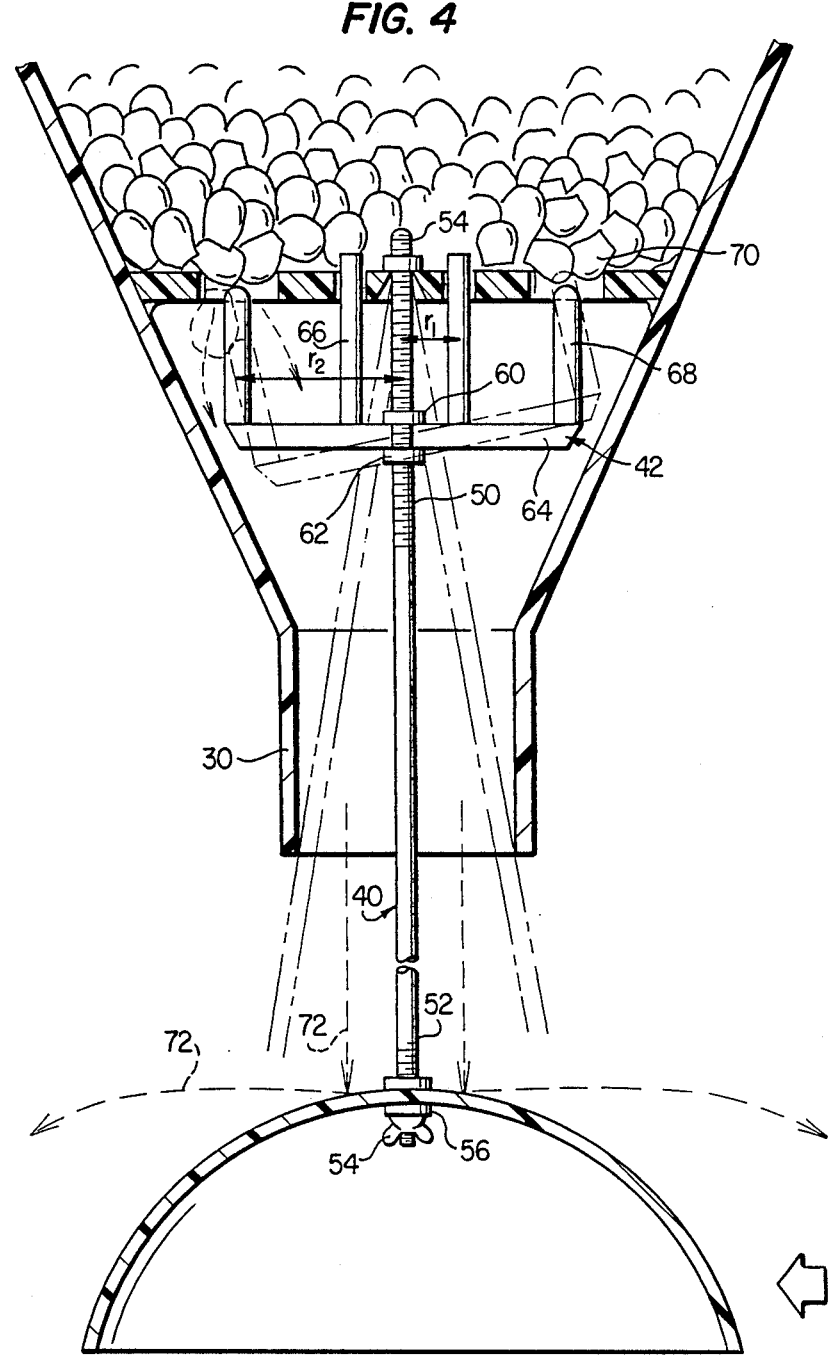
FIG. 4 is an illustrative vertical cross section of the distributing assembly in the feeder.

The rod 40 can be seen to have a threaded upper end 50 and a threaded lower end 52. The upper end 50 extends through pivot orifice 44 in the plate 38 and is hung therefrom by a nut 54 which can be adjusted relative to the length of the rod by simply threading the nut along the threaded portion of the upper end 50. Similarly, the lower end 52 extends through an orifice 56 in the sphere 14 and the sphere is suspended therefrom by a nut 54 threaded on to the threaded portion of lower end 52. With reference to FIG. 4, the pivot orifice 44 can be sufficiently larger in diameter than the rod 40 to permit the rod to pivot from vertical in any direction with the pivot motion limited by the rod contacting the inside surface of the discharge opening 30 as illustrated in phantom line in FIG. 4. Thus, as the wind hits the sphere 14 from any direction, the sphere and pivot rod will pivot about the pivot orifice 44.

Metering disc 42 is mounted on the upper end 50 of the rod 40 on the threaded portion of the upper end by nuts 60 and 62. As best seen in FIGS. 2, 3 and 4, the disc 42 includes a generally horizontal base 64, four upstanding guide posts 66 and four upstanding metering posts 68. The base 64 has an aperture therethrough which permits the base to be slid over the upper end of the rod so that the center line of the rod coincides with the center of the disc 42. The guide posts are mounted to the base at radius r1 from the center and at 90° intervals from the adjacent guide posts. The metering posts 68 are mounted on the base at radius r2 from the center of the disc and are also spaced at 90° intervals relative to the adjacent metering post. Each metering post 68 can be seen to lie on a radius which in part coincides with the radius of a guide post 66.

In operation, the nuts 60 and 62 can be threaded along the upper end 50 of the rod 40 to position the metering disc 42 so that the guide posts 66 extend at least into, if not through, the guide orifices 46, as seen in FIG. 4. Also, the metering posts 68 will, in this position, be positioned either partly into or through the feed orifices 48 so that when the rod 40 is vertical, the metering posts 68 prevent feed 70 from passing through feed orifices 48 to exit the feeder. However, as the wind impacts on sphere 14, the sphere, rod 40 and posts 66 and 68 pivot from the vertical, as shown in phantom line in FIG. 4, to permit feed to fall through a feed orifice and out of the feeder 10. As illustrated, the sphere 14 has the additional effect of distributing the feed about the feeder, as the feed will drop on to the sphere and bounce off the sphere away from the feeder as shown by arrows 72. By adjusting the position of nuts 54, 60 and 62, the feeder can be tuned to provide a desired release of feed for particular wind conditions.

A handle 74 is pivotally mounted to the bucket 16 at embossments 76 near the bottom of the bucket 16, with one inch hole 80 at the top in the center to hang the bucket straight, using rope 82, wire, etc. While this would be an unstable mount of the feeder in the absence of other support, snapfit extensions 78 extend outward from the bucket near the upper end 20 of the bucket directly above each embossment to receive the handle 74 securely in a snapfit to provide a stable mounting of the feeder. However, when the feeder is to be reloaded, the handles can be snapped out of the extensions 78, the feeder tilted about the pivot points provided by embossment 76, and the upper end 20 of the bucket more easily accessed for refilling the bucket interior.

In accordance with one feeder constructed in accordance with the teachings of the present invention, the feed orifices have a ¾ inch diameter. The guide orifices have a ¼ inch diameter. The metering posts have a ⅝ inch diameter and the guide posts have a 3/16 inch diameter. The discharge opening has an interior diameter of two inches, permitting the rod to move an inch from its vertical position in any direction. Preferably, the feeder is designed to accept at least an entire 50 lb. bag of corn when empty.

With reference to FIG. 5, a feeder 100 forming a first modification of feeder 10 is illustrated. In feeder 100, an electric feeding assembly 102 is mounted on section 84 and provides for discharge of feed at a controlled rate from the feeder. The electric feeding assembly 102 is similar to those already known in the industry, and is provided with an electric motor to drive a distribution wheel mounted on the drive shaft of the motor, and a time circuit to occasionally stop and start the motor. When the motor is stopped, the wheel prevents corn from escaping the feeder. When the motor is running, the wheel throws out kernels of corn as the wheel rotates. Usually, such electric feeding assemblies are powered by four D size batteries.

While one embodiment of the present invention has been illustrated in the accompanying drawings, and described in the foregoing Detailed Description, it will be understood that the invention is not limited to the embodiment disclosed, but is capable of numerous rearrangements, size, modifications and substitutions of parts and elements without departing from the scope and spirit of the invention.

I claim:

1. A deer feeder, comprising:
   a bucket having an interior;
   a conical section having an interior and extending from the lower end of the bucket, the conical section having a discharge opening at its lower end;
   a distributing assembly, including:
   a plate mounted in the interior of the conical section and having at least one feed orifice of predetermined size therethrough for feed to pass from the interior of the bucket to exterior the feeder;
   a rod pivoted at its upper end to the plate and extending downward through the discharge opening; and
   a metering disc mounted on the rod having a metering post of predetermined size so that when the rod is vertical, the metering post prevents feed from passing through the feed orifice to the discharge opening, movement of the rod from vertical in a predetermined direction causing the metering post to move relative to the feed orifice to permit a predetermined quantity of feed to pass through the feed orifice to the discharge opening.

2. The deer feeder of claim 1 further having a handle pivotally attached to the bucket near the lower end of the bucket, and at least one clip extending from the bucket near the upper end thereof for attachment of the handle to support the feeder in the desired orientation.

3. The deer feeder of claim 1 wherein the plate has a center, said plate further having four feed orifices formed therethrough at equal radii from the center and at 90° intervals relative to adjacent feed orifices, said metering disc further having a center, and four metering posts formed at the equal radii from the center and at 90° intervals to adjacent metering posts.

4. The deer feeder of claim 1 wherein the bucket and conical section are formed in one piece of plastic.

5. The deer feeder of claim 1 wherein the bucket is formed of plastic and further has horizontally outwardly extending reinforcement ribs near the upper and lower ends of the bucket.

6. The deer feeder of claim 1 wherein the plate having a pivot orifice at its center, the rod having a threaded portion at its upper end, the deer feeder further including a nut threaded on to the threaded portion to pivot the rod to the plate at the pivot orifice.

7. The deer feeder of claim 6 wherein the metering disc has a center, and an aperture therethrough at its center, the disc being mounted to the rod along the threaded portion by nuts on either side of the metering disc.

8. The deer feeder of claim 1 wherein a sphere is mounted at the lower end of the rod to move the rod from vertical under the influence of the wind, the sphere beneath the discharge opening and dispensing feed hitting the sphere.

* * * * *